(12) United States Patent
Moturu

(10) Patent No.: US 10,389,698 B1
(45) Date of Patent: *Aug. 20, 2019

(54) TECHNIQUE FOR FACILITATING AUTO LOGIN TO A WEBSITE

(71) Applicant: INTUIT INC., Mountain View, CA (US)

(72) Inventor: Tapasvi Moturu, Sunnyvale, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/051,807

(22) Filed: Aug. 1, 2018

Related U.S. Application Data

(63) Continuation of application No. 14/295,709, filed on Jun. 4, 2014, now Pat. No. 10,069,812.

(60) Provisional application No. 61/953,203, filed on Mar. 14, 2014.

(51) Int. Cl.
  *H04L 29/06* (2006.01)
(52) U.S. Cl.
  CPC .................................. *H04L 63/08* (2013.01)
(58) Field of Classification Search
  CPC ...................................................... H04L 63/08
  See application file for complete search history.

(56) References Cited

U.S. PATENT DOCUMENTS

| | | |
|---|---|---|
| 7,318,234 B1 | 1/2008 | Dharmarajan |
| 7,464,162 B2 | 12/2008 | Chan |
| 7,908,649 B1 | 3/2011 | Arora et al. |
| 8,533,804 B2 | 9/2013 | Ho et al. |
| 2004/0059941 A1 | 3/2004 | Hardman et al. |
| 2006/0130131 A1 | 6/2006 | Pai et al. |
| 2008/0201332 A1 | 8/2008 | Souders et al. |
| 2009/0276492 A1 | 11/2009 | Bobbitt et al. |
| 2010/0332488 A1 | 12/2010 | Horvitz et al. |
| 2013/0007869 A1 | 1/2013 | Thomas |
| 2015/0096001 A1 | 4/2015 | Morikuni et al. |
| 2015/0278504 A1 | 10/2015 | Azim et al. |

*Primary Examiner* — Simon P Kanaan
(74) *Attorney, Agent, or Firm* — Patterson + Sheridan, LLP

(57) ABSTRACT

A computer-implemented method for facilitating an auto login from a browser to a website is provided. The browser sends a first request on behalf of a user for a secure page to the server for the website. The server then returns a response to the first request which includes HTML and one or more meta tags comprising a URL for a login page. Additionally, the meta tags specify the parameters the login page requires. After confirming that a credential for the user is stored in the browser, the browser issues a second request to the server with the credential and the URL for the login page from the meta tag. Next, the server returns a response to the second request which includes a cookie. After receiving the cookie, the browser saves the cookie and then reloads the secure page using the saved cookie without requiring a manual login operation.

20 Claims, 4 Drawing Sheets

```
<html>
<head>
<meta og:login url=intuit.com/account type="POST"
params="username, password">
</head>
   ⋮
</html>
```

TECHNIQUE FOR FACILITATING AUTO LOGIN TO A WEBSITE

RELATED APPLICATION

The present patent is a continuation of, and hereby claims priority under 35 U.S.C § 120 to pending U.S. patent application Ser. No. 14/295,709, entitled "TECHNIQUE FOR FACILITATING AUTO LOGIN TO A WEBSITE," by the same inventor, filed on 4 Jun. 2014.

This application claims the benefit of U.S. Provisional Application No. 61/953,203, entitled "TECHNIQUE FOR FACILITATING AUTO LOGIN TO A WEB SITE," by inventors Tapasvi Moturu, filed 14 Mar. 2014.

BACKGROUND

Related Art

The present disclosure relates to a technique that enables a user to auto login to a website regardless of what web page the user lands on.

The rapid proliferation of computer networks and associated protocols presently enables users to take advantage of a wide variety of web-based applications and services provided by different websites. Common examples of such web services include, but are not limited to, electronic messaging services, social network applications, and personal banking services. When accessing the Internet, an Internet user typically launches or activates a web browser, which facilitates establishing a connection between the user's computer and various websites. When accessing certain websites, such as websites associated with financial institutions, it may be necessary for a user to enter login credentials, such as a username and password, before being allowed access to secure pages on the website.

Many existing web browsers try to assist users in logging in to websites by storing login information and automatically filling in login forms when the user navigates to a login page. However, existing auto login solutions only pre-fill usernames and passwords when the user navigates to a specific login page, and users still have to manually click a login button.

During an existing auto login process, when a user navigates to a login page, the browser detects the login page and then populates the username and password fields with stored login information. However, if a user lands on a web page that is different from the login page (and which requires the user to log in), the web server will redirect the user to the login page and will let the user log in manually. This can be annoying to the user who has previously entered his username and password and expects to be automatically logged in.

Hence, what is needed is a technique for facilitating an auto login process in cases where a browser lands on a secure page which is not a login page.

SUMMARY

The disclosed embodiments relate to a system that automatically logs a user into a website based on login information the system stored when the user previously logged into the website. This system includes functionality to accomplish this login operation even in cases where a user initially navigates to a page in the website that is not a login page. In contrast, as mentioned above, existing auto-login systems typically redirect such a user to a login page where the user must log in manually.

More specifically, the disclosed embodiments relate to a computer-implemented method for automatically submitting login information from a browser to a website. During operation, the browser sends an initial request for a secure page to a web server. The web server then returns a response to the initial request which includes HyperText Markup Language (HTML) with a meta tag comprising a uniform resource locator (URL) for a login page. Additionally, the meta tag contains login parameters (e.g., username and password) and specifies the type of HyperText Transfer Protocol (HTTP) method the login process requires (e.g., an HTTP POST method). Next, the browser determines whether the credential is stored in the local storage. If so, the browser issues a second request to the server with the username and password, wherein the second request is directed to the login URL specified in the meta tag. In response to the second request, the server returns a cookie. After receiving the cookie from the server, the browser saves the cookie and then redirects to the secure page and sends the saved cookie back to the server. Then, the server validates the cookie and sends the secure content to the browser. Finally, the browser receives the secure content and renders the associated secure page.

In some embodiments, if the server receives a request to log in, and the request includes a cookie, the server simply validates the cookie, retrieves associated session information and completes the redirection to the secure page. If the cookie is not valid, the user must log in again.

In some embodiments, the above-described auto login method is performed in an embedded browser.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
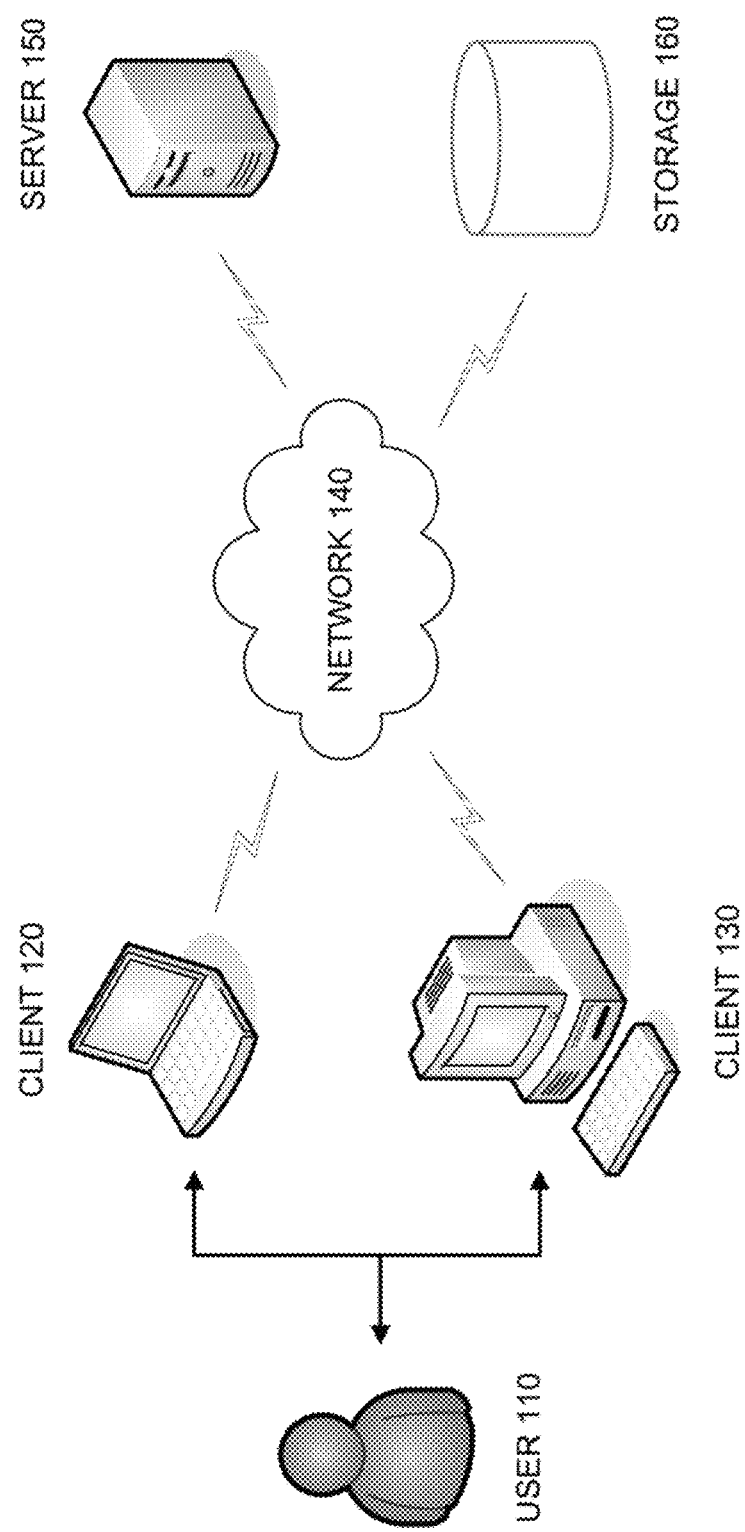
FIG. 1 illustrates a system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

In this description, references to "an embodiment," "one embodiment" or "some embodiments" mean that the feature being referred to is, or may be, included in at least one embodiment or example of the invention. Separate references to "an embodiment," "one embodiment" or "some embodiment" in this description are not intended to necessarily refer to the same embodiment or example; however, neither are such embodiments mutually exclusive, unless so stated or as will be readily apparent to those of ordinary skill in the art having the benefit of this disclosure. Thus, the present disclosure includes a variety of combinations and/or integrations of the embodiments and examples described herein, as well as further embodiments and examples as defined within the scope of all claims based on this disclosure, as well as all legal equivalents of such claims.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The techniques described herein may operate in conjunction with the standard client-server system as is illustrated in FIG. 1 in accordance with an embodiment of the present invention. In this system, users 110 operates Internet-connectable clients 120 or 130 (e.g., desktop computers, notebook computers, or the like) that are capable of accessing and interacting with the server 150 through network 140 along with storage 160. Typically, each client or server is a data processing system comprising hardware and software, and these entities communicate with one another over a network, such as the Internet, an intranet, an extranet, a private network, or any other medium or link. These data processing systems typically include one or more processors, an operating system, one or more applications, and one or more utilities. Applications running on the data processing systems provide native support for web protocols including, but not limited to, support for HTTP and Extensible Markup Language (XML), among others.

User 110 can include: an individual; a group of individuals; an organization; a group of organizations; a computing system; a group of computing systems; or any other entity that can interact with clients 120 and 130.

Clients 120 and 130 can include any node on a network including computational capability and including a mechanism for communicating across the network. Additionally, clients 120 and 130 may comprise a tier in an n-tier application architecture, wherein clients 120 and 130 function as servers servicing requests from lower tiers or users, and wherein clients 120 and 130 function as clients (forwarding the requests to a higher tier).

Network 140 can include any type of wired or wireless communication channel capable of coupling together computing nodes. This includes, but is not limited to, a local area network, a wide area network, or a combination of networks. In some embodiments, network 140 may include: the Internet, World Wide Web (WWW), an intranet, a cellular-telephone network, LAN, WAN, MAN, or a combination of networks, or other technology enabling communication between computing systems.

Similarly, server 150 can generally include any node on a network including a mechanism for servicing requests from a client for computational and/or data storage resources. Server 150 can participate in an advanced computing cluster, or can act as standalone servers. Server 150 provides data, such as boot files, operating system images, and applications to the clients 120 and 130.

Storage 160 can include any type of system that is capable of storing information either on a temporary basis and/or permanent basis (e.g., a random access memory or any other suitable volatile or non-volatile storage device, a hard drive, or the like). This includes, but is not limited to, systems based upon magnetic, optical, or magneto-optical storage devices, as well as storage devices based on flash memory and/or battery-backed up memory.

Note that different embodiments of the present invention may use different system configurations, and are not meant to be limited to the system configuration illustrated above. In general, any device that is capable of communicating via network 160 may incorporate elements of the present invention.

Figure 2:
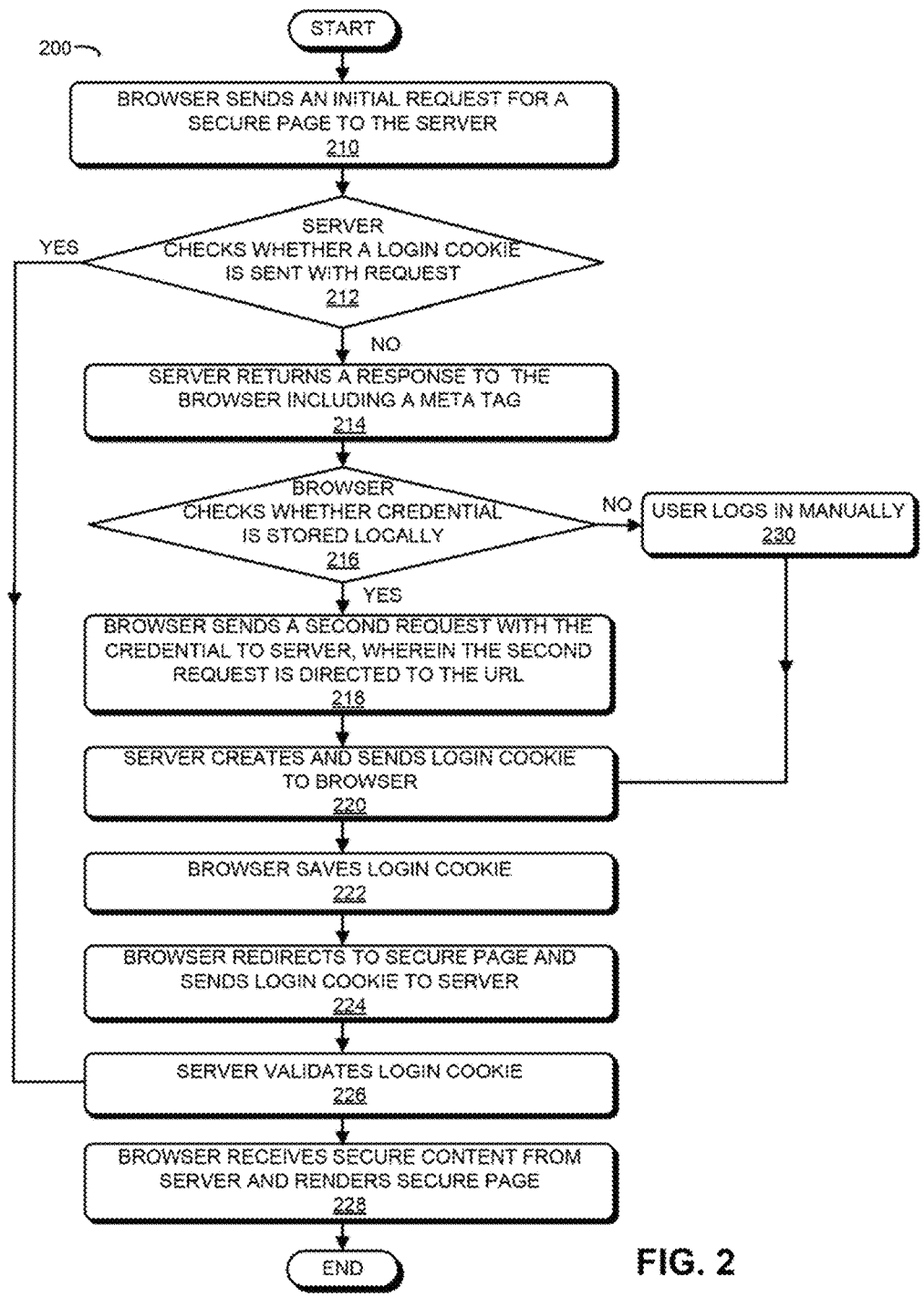
FIG. 2 presents a flow chart illustrating an auto login process in accordance with an embodiment of the present invention.

FIG. 2 presents a flow chart illustrating the auto login process in accordance with one embodiment of the present invention. At the start of this auto login process, a user 110 of client 120 launches a web page which requires user 110 to perform a login operation. The launching of the web page may be associated with the user clicking on a link, manually entering a URL into the browser, selecting an identified resource, or the like. In some cases, the web page may contain secure content which requires the user to log in first before displaying the secure content. After launching the web page, the browser sends an initial request to a server for the web page (step 210). In one embodiment, the request is delivered over a secure connection (e.g., using Secure Sockets Layer (SSL)).

Next, the browser determines whether a login cookie is stored in the browser. If the login cookie is stored in the browser, the browser sends the login cookie along with the initial request to the server. After the server receives the initial request from the browser, the server checks whether a login cookie was sent with the initial request (step 212). If a login cookie was sent, the server simply validates the login cookie and retrieves session information (step 226).

The term "cookie" should be broadly construed to refer to a mechanism similar to an HTTP cookie (RFC 2109). Every time the user accesses the website, the browser sends the cookie back to the associated web server to notify the web server of the user's previous activity. Cookies provide a mechanism that enables a website to remember state information or to record the user's browsing activity (including clicking particular buttons, logging in, or recording which pages were visited by the user as far back as months or years ago). A website may save login information such as username and password in a cookie when the user logs in for the first time. The next time the user visits the website, the browser sends the login cookie back to the website, and the user will be logged in automatically.

Cookies can be used to retain user preferences for a particular website, allowing those preferences to be used in future browsing sessions. Cookies can also be used to identify individual users, which allow the cookies to be used by websites to analyze user's surfing behavior on a website. Additionally, cookies can be used to provide information about numbers of visitors, the average time spent on a particular page, and generally the performance of the website. Cookie-based systems are usually configured to keep track of users for a prolonged period of time, in some cases many years into the future.

Referring back to FIG. 2, at step 212, when the web server receives a request for a secure page that does not contain a login cookie, the server returns a response to the initial request comprising one or more meta tags (step 214). In some embodiments, the meta tags specify a URL for an associated login page. Additionally, the meta tags may contain the parameters the login page requires (e.g., username and password) and the type of HTTP method it requires (e.g., an HTTP POST method).

Figures 3, 4:
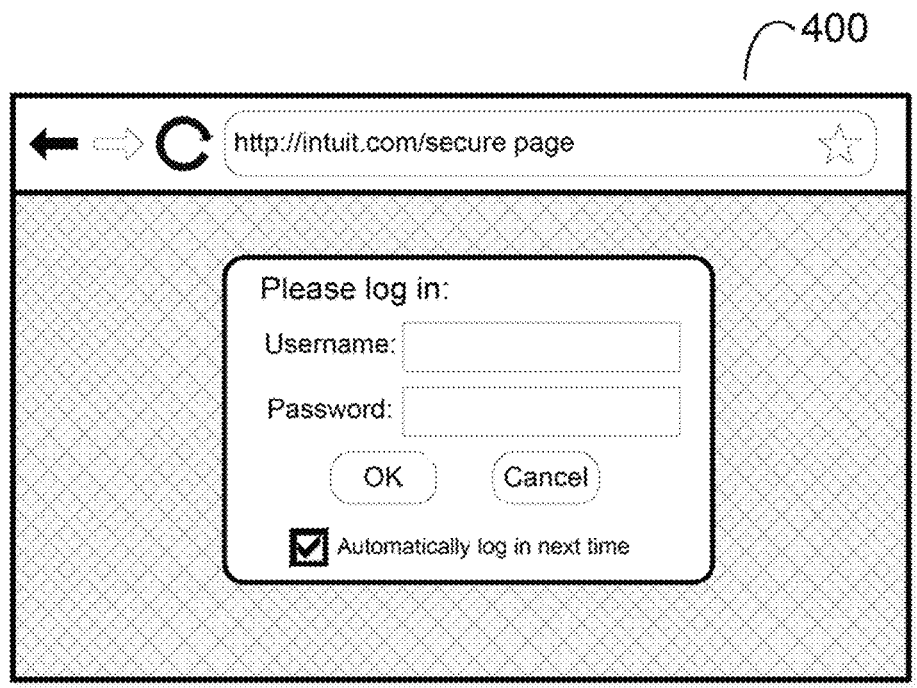
FIG. 3 illustrates sample code used by the server comprising a meta tag in accordance with an embodiment of the present invention.
FIG. 4 illustrates a login page displaying a login form in accordance with an embodiment of the present invention.

Note that metadata located in a web page will not be displayed on the browser, but will be machine readable. The metadata can be used by browsers (i.e., to display content or reload page), search engines (keywords), or other web services. FIG. 3 illustrates sample HTML code 300 including the meta tags created in response to the browser request. As described in FIG. 3, these meta tags contain a URL which specifies the login location (e.g., intuit.com/account), the parameters (e.g., username and password) passed to the login page, and the type of HTTP method the login page supports (e.g., POST). Note that the HTTP POST method is used to submit data (e.g., username and password) to a specified resource (e.g., login page). In some embodiments, the metadata for the login mechanism is described on every web page of the website.

Referring back to FIG. 2, after receiving the response comprising the meta tags from the server, the browser checks whether a login credential is stored in the browser's local storage (step 216). If no login credential is stored in the browser's local storage, the user is required to manually enter a login credential into the login form on the login page (step 230). FIG. 4 illustrates a login page 400 displaying a login form in accordance with an embodiment of the present invention.

The above-described auto login function preferably uses a secure login process that requires the user to enter a credential before the auto login commences. If a user has not previously entered the credential, or if the user previously entered a credential during a session and a predetermined amount of time has elapsed since the user entered the credential, the user will be prompted to enter the login credential again. In some embodiments, the user is prompted with a login window showing a login form on a login page. This login form includes authentication credentials that must be filled in before the browser is redirected to the desired target resource (e.g., secure page URL).

Note that the user needs to type in the username and password and click the "OK" or submit button to complete the login process. In some embodiments, a cancel button may also be displayed during the login process. The cancel button, when selected by a user, causes the login process to terminate. In one embodiment, the cancel button is not part of the login page. In some embodiments, to enable the auto login function, a user simply checks a box for auto login on the login page. The auto login function may save the user's login information in a password manager, or in cookies.

Referring back to FIG. 2, after determining that the login credential is stored in the browser's local storage, the browser sends a second request associated with the login URL to the server (step 218). In one embodiment, the login credential is sent with the second request to the server. After receiving the login credential from the browser, the server authenticates the user and sends a response to the browser (step 220). In some embodiments, the response may request the browser to store a cookie.

In some embodiments, the response may also contain instructions to redirect the browser to the secure page. After receiving the response from the server, the browser saves the login cookie (step 222), and redirects to the secure page and sends the login cookie to the server (step 224). Subsequently, the server validates the login cookie (step 226) and sends the HTML that includes the secure content to the browser. After receiving the secure content with the HTML, the browser renders the secure page (step 228).

The term "browser," as used herein, is not intended to refer to any specific browser (e.g., Internet Explorer®, Safari®, FireFox®, or the like), but should be broadly construed to refer to any client-side rendering engine that can access and display Internet-accessible resources. The browser enables an Internet user to navigate the Internet and establish a connection to various Internet sites (also referred to herein as websites) and view associated web pages. As used herein, the term "website" refers to a location on the Internet defined by an Internet address or URL. Also, the term "website" should be broadly construed to cover a website (a set of pages), a domain at a given website or server, a trust domain associated with a server or set of servers, or the like.

Figure 5:
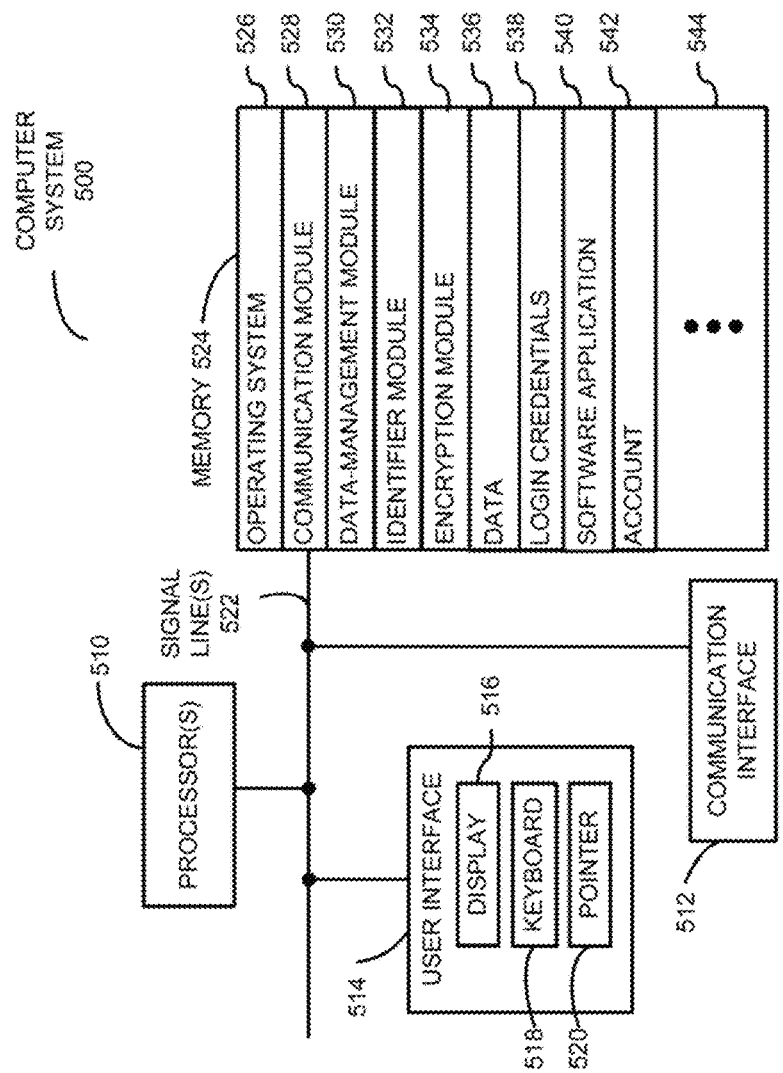
FIG. 5 presents a block diagram illustrating a computer system that performs the method in accordance with an embodiment of the present invention.

FIG. 5 presents a block diagram illustrating a computer system 500 that performs method 200 (FIG. 2). Computer system 500 includes one or more processing units or processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in computer system 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500.

Memory 524 may also include multiple program modules (or sets of instructions), including: data-management module 530 (or a set of instructions), identifier module 532 (or a set of instructions), encryption module 534 (or a set of instructions), and/or software application 540 (or a set of instructions). Note that one or more of these program modules (or sets of instructions) may constitute a computer-program mechanism.

During an HTTP transfer, data-management module 530 may receive data 536 via communication module 528 and communication interface 512. As noted previously, data 536 may be received without receiving login credentials 538 for an account 542 of a user.

Then, identifier module 532 may specify identifiers for Internet users. Moreover, data-management module 530 may store data 536 and identifiers in memory 524.

Data-management module 530 may receive login credentials 538 for account 542 via communication module 528 and communication interface 512. Additionally, data-management module 530 may optionally use data 536 with software application 540, which may be associated with account 542.

Because information used in the authentication technique may be sensitive in nature, in some embodiments at least some of the data stored in memory 524 and/or at least some of the data communicated using communication module 528 is encrypted or decrypted using encryption module 534.

Instructions in the various modules in memory 524 may be implemented in: a high-level procedural language, an object-oriented programming language, and/or in an assembly or machine language. Note that the programming language may be compiled or interpreted, e.g., configurable or configured, to be executed by the one or more processors 510.

Although computer system 500 is illustrated as comprising a number of discrete components, FIG. 5 is intended to be a functional description of the various features that may be present in computer system 500 rather than a structural schematic of the embodiments described herein. In some embodiments, some or all of the functionality of computer system 500 may be implemented in one or more application-specific integrated circuits (ASICs) and/or one or more digital signal processors (DSPs).

Computer system 500, as well as electronic devices, computers and servers in system 500 (FIG. 5), may include one of a variety of devices capable of manipulating computer-readable data or communicating such data between two or more computing systems over a network, including: a personal computer, a laptop computer, a tablet computer, a mainframe computer, a portable electronic device (such as a cellular telephone or PDA), a server, a point-of-sale terminal and/or a client computer (in a client-server architecture).

In some embodiments, the method described in the present application may be executed as an application tool that is embedded in the web browser, and which executes in a virtual environment of the web browser. Thus, the application tool may be provided to the user via client-server architecture. This software application may be a standalone application or a portion of another application that is resident on and which executes on clients.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method to facilitate auto login from a browser, the method comprising:
    navigating to a secure page of a website in response to a user performing one of the following actions:
        clicking on a link;
        entering a Uniform Resource Locator (URL) into the browser; or
        selecting an identified resource,
    wherein the secure page contains secure content that requires the user to log in before accessing the secure content;
    determining that a login cookie for the secure page is not stored in a file accessible by the browser;
    sending an initial request on behalf of the user to access the secure page from the browser to a server;
    receiving, by the browser, an initial response from the server, wherein the initial response includes a meta tag, wherein the meta tag specifies a URL for a login page, one or more login parameters, and an HTTP method for submitting a login request to the URL for the login page;
    determining, by the browser, whether a username and a password corresponding to the login parameters and different than the login cookie are stored in a browser controlled credential store;
    upon determining, by the browser, that a username and a password corresponding to the login parameters are stored in the browser controlled credential store, sending a second request from the browser to the server using the HTTP method, wherein the second request is directed to the URL for the login page and includes the username and the password retrieved by the browser from the browser controlled credential store;
    receiving, by the browser, the login cookie from the server in response to the second request and saving the login cookie in a file;
    resending the initial request to access the secure page and sending the login cookie from the browser back to the server with the request; and
    after the server validates the login cookie, receiving, by the browser, the secure content from the server and rendering the secure page in the browser.

2. The computer-implemented method of claim 1, wherein the HTTP method comprises an HTTP POST method.

3. The computer-implemented method of claim 1, wherein the secure page is not the login page.

4. The computer-implemented method of claim 1, wherein the login parameters comprise the username and the password.

5. The computer-implemented method of claim 1, wherein the initial response includes HTML of the secure page.

6. The computer-implemented method of claim 1, wherein the method further comprises: upon determining, by the browser, that the browser controlled credential store does not store a username and a password corresponding to the login parameters:
    receiving, by the browser and from a user, credentials corresponding to the login parameters;
    sending a second request from the browser to the server using the HTTP method, wherein the second request includes the credentials; and
    saving, by the browser, the credentials in the browser controlled credential store.

7. A non-transitory computer-readable storage medium storing instructions that when executed by a computer cause the computer to perform a method to facilitate auto login from a browser, the method comprising:
    navigating to a secure page of a website in response to a user performing one of the following actions:
        clicking on a link;
        entering a Uniform Resource Locator (URL) into the browser; or
        selecting an identified resource,
    wherein the secure page contains secure content that requires the user to log in before accessing the secure content;
    determining that a login cookie for the secure page is not stored in a file accessible by the browser;
    sending an initial request on behalf of the user to access the secure page from the browser to a server;
    receiving, by the browser, an initial response from the server, wherein the initial response includes a meta tag, wherein the meta tag specifies a URL for a login page, one or more login parameters, and an HTTP method for submitting a login request to the URL for the login page;
    determining, by the browser, whether a username and a password corresponding to the login parameters and different than the login cookie are stored in a browser controlled credential store;
    upon determining, by the browser, that a username and a password corresponding to the login parameters are stored in the browser controlled credential store, sending a second request from the browser to the server using the HTTP method, wherein the second request is directed to the URL for the login page and includes the username and the password retrieved by the browser from the browser controlled credential store;
    receiving, by the browser, the login cookie from the server in response to the second request and saving the login cookie in a file;
    resending the initial request to access the secure page and sending the login cookie from the browser back to the server with the request; and
    after the server validates the login cookie, receiving, by the browser, the secure content from the server and rendering the secure page in the browser.

8. The non-transitory computer-readable storage medium of claim 7, wherein the HTTP method comprises an HTTP POST method.

9. The non-transitory computer-readable storage medium of claim 7, wherein the secure page is not the login page.

10. The non-transitory computer-readable storage medium of claim 7, wherein the login parameters comprise the username and the password.

11. The non-transitory computer-readable storage medium of claim 7, wherein the initial response includes HTML of the secure page.

12. The non-transitory computer-readable storage medium of claim 7, wherein the method further comprises: upon determining, by the browser, that the browser controlled credential store does not store a username and a password corresponding to the login parameters:
    receiving, by the browser and from a user, credentials corresponding to the login parameters;
    sending a second request from the browser to the server using the HTTP method, wherein the second request includes the credentials; and
    saving, by the browser, the credentials in the browser controlled credential store.

13. The non-transitory computer-readable storage medium of claim 7, wherein the second request comprises a login form populated with the username and the password.

14. A computer system configured to facilitate auto login from a browser, comprising:
    a processor; and
    a memory, wherein a program module is stored in the memory and configurable to be executed by the processor to associate data with an account, the program module including:
        instructions for navigating to a secure page of a web site in response to a user performing one of the following actions:
            clicking on a link;
            entering a Uniform Resource Locator (URL) into the browser; or
            selecting an identified resource,
        wherein the secure page contains secure content that requires the user to log in before accessing the secure content;
        instructions for determining that a login cookie for the secure page is not stored in a file accessible by the browser;
        instructions for sending an initial request on behalf of the user to access the secure page from the browser to a server;
        instructions for receiving, by the browser, an initial response from the server, wherein the initial response includes a meta tag, wherein the meta tag specifies a URL for a login page, one or more login parameters, and an HTTP method for submitting a login request to the URL for the login page;
        instructions for determining, by the browser, whether a username and a password corresponding to the login parameters are stored in a browser controlled credential store;
        upon determining, by the browser, that a username and a password corresponding to the login parameters and different than the login cookie are stored in the browser controlled credential store, instructions for sending a second request from the browser to the server using the HTTP method, wherein the second request is directed to the URL for the login page and includes the username and the password retrieved by the browser from the browser controlled credential store;
        instructions for receiving, by the browser, the login cookie from the server in response to the second request and saving the login cookie in a file;
        instructions for resending the initial request to access the secure page and sending the login cookie from the browser back to the server with the request; and
        after the server validates the login cookie, instructions for receiving, by the browser, the secure content from the server and rendering the secure page in the browser.

15. The computer system of claim 14, wherein the HTTP method comprises an HTTP POST method.

16. The computer system of claim 14, wherein the secure page is not the login page.

17. The computer system of claim 14, wherein the login parameters comprise the username and the password.

18. The computer system of claim 14, wherein the initial response includes HTML of the secure page.

19. The computer system of claim 14, wherein the program module further includes:
   upon determining, by the browser, that the browser controlled credential store does not store a username and a password corresponding to the login parameters:
   instructions for receiving, by the browser and from a user, credentials corresponding to the login parameters;
   instructions for sending a second request from the browser to the server using the HTTP method, wherein the second request includes the credentials; and
   instructions saving, by the browser, the credentials in the browser controlled credential store.

20. The computer system of claim 14, wherein the second request comprises a login form populated with the username and the password.

\* \* \* \* \*